(12) United States Patent
Basso et al.

(10) Patent No.: US 6,721,800 B1
(45) Date of Patent: Apr. 13, 2004

(54) SYSTEM USING WEIGHTED NEXT HOP OPTION IN ROUTING TABLE TO INCLUDE PROBABILITY OF ROUTING A PACKET FOR PROVIDING EQUAL COST MULTIPATH FORWARDING PACKETS

(75) Inventors: Claude Basso, Raleigh, NC (US); Anthony Matteo Gallo, Apex, NC (US); Natarajan Vaidhyanathan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,702

(22) Filed: Apr. 10, 2000

(51) Int. Cl.[7] .............................................. G06F 15/173
(52) U.S. Cl. ...................................... 709/239; 709/242
(58) Field of Search ................................. 709/238, 239, 709/240, 241, 242; 370/218, 351, 238; 701/202

(56) References Cited

U.S. PATENT DOCUMENTS

| | | | |
|---|---|---|---|
| 5,822,301 A | * 10/1998 | Arnold et al. | ............... 370/238 |
| 6,266,706 B1 | * 7/2001 | Brodnik et al. | ............. 709/242 |
| 6,314,093 B1 | * 11/2001 | Mann et al. | ................. 370/351 |
| 6,363,319 B1 | * 3/2002 | Hsu | ........................... 701/202 |
| 6,400,681 B1 | * 6/2002 | Bertin et al. | ................. 370/218 |

* cited by examiner

*Primary Examiner*—Le Hien Luu
(74) *Attorney, Agent, or Firm*—Scully, Scott, Murphy & Presser

(57) ABSTRACT

A system and method for providing the ability for a network processor to select from multiple next hop options for a single forwarding entry and provide the ability to weight the probability of which next hop will be chosen.

9 Claims, 2 Drawing Sheets

FIG. 1
Prior Art
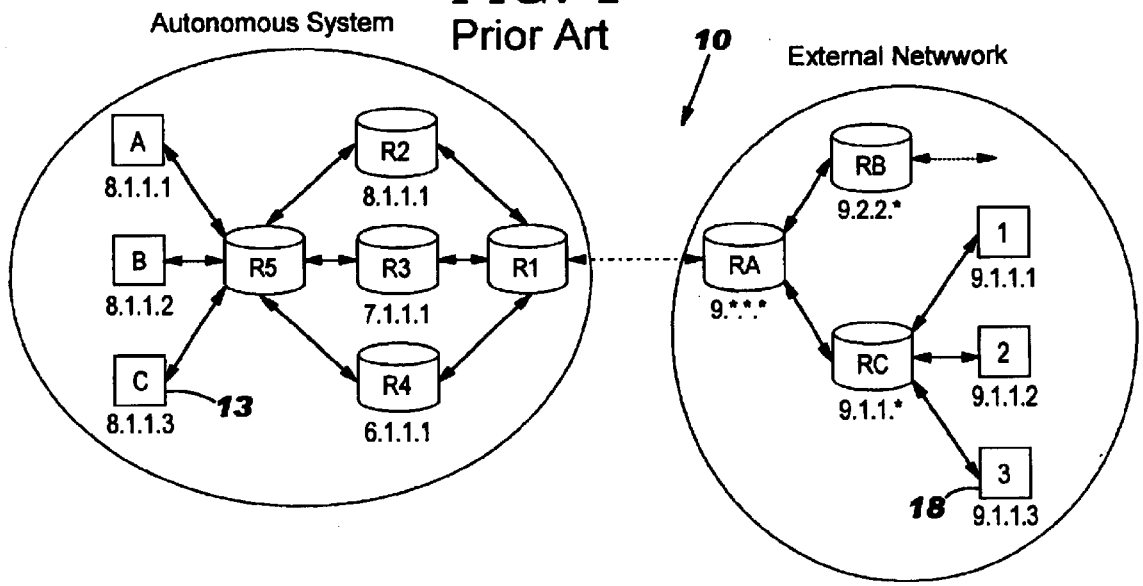
FIG. 2
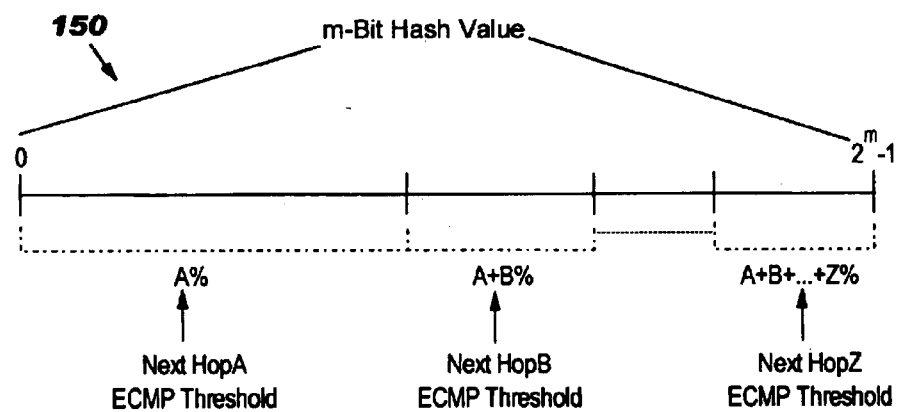
FIG. 3

SYSTEM USING WEIGHTED NEXT HOP OPTION IN ROUTING TABLE TO INCLUDE PROBABILITY OF ROUTING A PACKET FOR PROVIDING EQUAL COST MULTIPATH FORWARDING PACKETS

BACKGROUND OF THE INVENTION

1. Field of the Invention

This invention relates generally to network processor devices, routers, and the like and, more specifically, to a packet forwarding table and packet routing method which provides multiple next hop options for a single forwarding entry and the ability to weight the probability with which each next hop is to be chosen.

2. Discussion of the Prior Art

Traditional packet routing capability provided in network processor devices, routers, switches, and the like, typically utilize a network routing table having entries which provide a single next hop for each table entry. FIG. 1 depicts a typical network routing scenario 10. To route a packet from System C 13 to System 3 indicated as element 18 in FIG. 1, a traditional packet forwarding table would provide one path (e.g., via router R2) from router R5 to R1. In the example network routing scenario of FIG. 1, it would be desirable to have the ability to route through R3 as well, or possibly even through R4.

In general, in a network processor, the ability to provide multiple next hop options coupled with the ability to weight which router in the network handles the amount of or what type of packets is very desirable.

SUMMARY OF THE INVENTION

It is an object of the present invention to provide a network processor with a network routing table having entries that include one or more next hops in addition to cumulative probability data for each corresponding next hop.

It is another object of the present invention to provide a method of randomly generating next hop seed values associated with a packet to be forwarded in a network and determining which next hop is chosen based on cumulative probability data for each corresponding next hop and the randomly generated next hop seed values.

According to the invention, there is provided a system and method for forwarding packets in a network processor (NP) device comprising: providing entries in a packet forwarding table for mapping a destination address associated with a packet to be forwarded to multiple, weighted next hop options in a networking environment; computing a weighting parameter based on data associated with the packet to be forwarded; and, routing the packet via one of the multiple next hop option selected in accordance with the computed weighting parameter. Preferably, the computing step includes applying a hash function to data associated with the packet to be forwarded to generate a corresponding hash value associated with that packet. For instance, in the case of a networking environment that includes an IP network, the data associated with the packet may comprise an IP source address and IP destination address of the packet to be forwarded. Each of the mapped multiple next hop options for each table entry includes a corresponding threshold value. Thus, to determine which next hop is selected in a packet forwarding operation, a comparison is made between the computed hash value and each corresponding threshold value.

The features of providing the ability for a media-speed, bandwidth conserving network processor device to select from multiple next hop options in a packet forwarding operation and providing the ability to weight the probability of which next hop will be chosen is extremely advantageous.

BRIEF DESCRIPTION OF THE DRAWINGS

Further features, aspects and advantages of the apparatus and methods of the present invention will become better understood with regard to the following description, appended claims, and accompanying drawings where:

FIG. 1 depicts generally a network processing scenario 100 including network processors (routers) employing the ECMP forwarding table of the invention.

FIG. 2 illustrates an example ECMP forwarding table for use in a network processor, router or packet switching device according to the present invention.

FIG. 3 illustrates conceptually the setting of the ECMP action data thresholds in accordance with an n-bit hash value.

DETAILED DESCRIPTION OF THE PREFERRED EMBODIMENT

Figure 4:
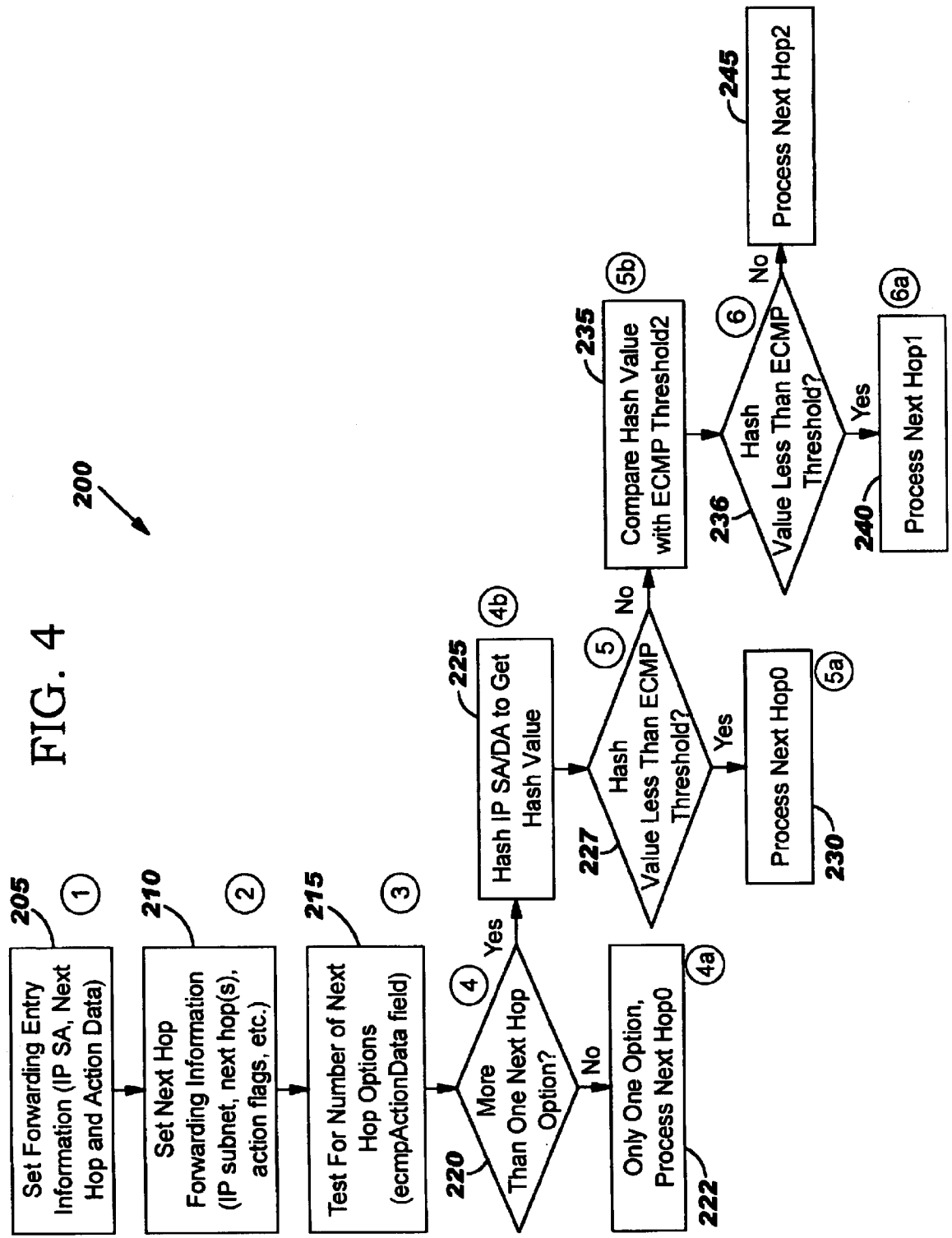
FIG. 4 is a block diagram illustrating the mechanism for routing next hop packets according to the ECMP forwarding table of the invention.

FIG. 2 depicts an example Equal Cost Multipath Forwarding (ECMP) table 50 of the invention that is used to provide a lookup of a nextHop address for forwarding packets. Preferably, such a table is employed in a Network Processor (NP) device having packet routing functions such as described in commonly-owned, co-pending U.S. patent application Ser. No. 09/384,691 filed Aug. 27, 1999 and entitled "NETWORK PROCESSOR PROCESSING COMPLEX AND METHODS", the whole contents and disclosure of which is incorporated by reference as if fully set forth herein. It is understood however, that the present invention may be employed in any frame/packet router device such as routers, switches, bridges, firewalls, etc.

With particular reference to herein incorporated, co-pending U.S. patent application Ser. No. 09/384,691, the general flow of a packet or frame received at the NP device is as follows: Frames received from an network connection, e.g., Ethernet MAC, are placed in internal data store buffers by an upside "enqueue" device (EDS-UP) where they are identified as either normal data frames or system control frames (Guided Frames). In the context of the invention, frames identified as normal data frames are enqueued to an Embedded Processor Complex (EPC) which comprises a plurality of picoprocessors, e.g., protocol processors. These picoprocessors execute logic (picocode) capable of looking at the received frame header and deciding what to do with the frame (forwardly, modify, filter, etc.). The EPC has access to several lookup tables, and classification hardware assists to allow the picoprocessors to keep up with the high-bandwidth requirements of the Network Processor. A classification hardware assist device in particular, is provided for classifying frames of well known frame formats. The Embedded Processing Complex (EPC) particularly provides and controls the programmability of the NP device and includes, among other components (such as memory, dispatcher, interfaces), N processing units, referred to as GxH, which concurrently execute picocode that is stored in a common instruction memory. It is understood, however, that the architecture and structure is completely scalable towards more GxHs with the only limitation being the amount of silicon area provided in the chip. In operation, classification results from the classification hardware assist device are passed to the GxH, during frame dispatch. Each GxH preferably includes a Processing Unit core (CLP) which comprises, e.g., a 3-stage pipeline, general purpose registers and an ALU. Several GxHs in particular, are defined as General Data Handlers (GDH) each of which comprise a full CLP with the five coprocessors and are primarily used for forwarding frames in accordance with the present invention. One GxH coprocessor, in particular, a Tree Search Engine Coprocessor (TSE) functions to access all tables, counters, and other data in a control memory that are needed by the picocode in performing tree searches used in forwarding data packets, thus freeing a protocol processor to continue execution. The TSE is particularly implemented for storing and retrieving information in various processing contexts, e.g., determining frame routing rules, lookup of frame forwarding information and, in some cases, frame alteration information.

The example ECMP forwarding table 50 of the invention is particularly implemented in a frame forwarding context for network processor operations. In the example ECMP forwarding table 50 depicted in FIG. 2, there is provided subnet destination address fields 52, with each forwarding entry including multiple next hop routing information comprising multiple next hop address fields, e.g., fields 60a–60c. Additionally provided in the ECMP routing table is cumulative probability data for each corresponding next hop such as depicted in action data field 70. Particularly, in the exemplary illustration of the ECMP packet forwarding table 50 of FIG. 2, there is included three (3) next hop fields to addresses 8.1.1.1, 7.1.1.1, 6.1.1.1 associated with a destination subnet address 9.*.*.*. An action data field 70 includes threshold values used to weight the probability of each next hop and is used to determine which next hop will be chosen. In the action field 72, shown in FIG. 2, these values as being stored as cumulative percentages with the first cumulative percentage (60%) corresponding to next hop 0, the second cumulative percentage value (90%) corresponding to next hop 1, etc. This means that, the likelihood of routing a packet through next hop 0 is 60% (i.e., approximately 60% of traffic for the specified table entry should be routed to next hop 0), and, the likelihood of routing a packet through next hop 1 is 30% (i.e., approximately 30% of traffic for the specified table entry should be routed to next hop 1). This technique may be extended to offer as many next hops as desired or feasible.

In the preferred embodiment of the invention, the IP Source Address (SA) and Destination Address (DA) of an arrived packet frame are used to generate a m-bit hash value (e.g., m=16 bits) The m-bit value hashed from the IP SA and DA values is then used to determine which next hop is selected. Given "n" next hop possibilities, the hash value range (0 to (($2^m$)–1)) is divided into "n" sections (buckets) based on the ECMP threshold values (e.g., 16 bit value) for each next hop entered in the action data field. Referring to FIG. 3, the m-bit hash value 150 is divided such that an ECMP threshold of A% corresponds to next hop 0, an ECMP threshold of A%+B% corresponds to next hop 1 and so on, until the entire hash value is divided. As shown, each successive next hop threshold is built upon a summation of each prior ECMP next hop threshold values. Thus, for instance, the last next hop Z, corresponds to an ECMP threshold of A%+B%+ . . . +Z%. In the example of FIG. 2, and referencing FIG. 3, the ECMP threshold A is equal to 60%, the ECMP threshold A+B is equal to 90% and, the ECMP threshold A+B+C is equal to 100%. Next hop 0 would thus receive 60% of the traffic, next hop 1 would receive about 30% of the traffic and next hop 2 would receive about 10% of traffic. As the hash value is determined by IP SA and DA, each next hop will not receive the exact percentage of traffic determined by each corresponding threshold.

FIG. 4 depicts the process 200 for enabling multiple next hops in a packet router table according to the invention. In FIG. 4, a first step 205 is performed which is the step of setting the forwarding entry information (IP subnet, Next Hop and Action Data) in the ECMP packet forwarding entry. The following C Language pseudocode sets forth an example data structure of type np_ipps_ucForwardingEntry_s that may be implemented in an application programming interface (API) for setting the packet forwarding entry information in accordance with step 205, FIG. 4:

```
typedef struct
{
np_ip_network_addr_s ipNetworkAddr;    /*IP Address +
PrefixLength*/
np_ipps_ecmpActionData_t ecmpActionData; /*contains thr1,
thr2...thrn*/
np_ipps_nextHopForwardingInfo_s nextHop0;
/*np_ipps_nextHopForwardingInfo_s nextHop1;present only if
thr1<100*/
/*np_ipps_nextHopFowardingInfo_s nextHop2; present only if
thr2<100*/
.
.
.
/*np_ipps_nextHopForwardingInfo_s nextHopn; present only if
thrn<100*/
}np_ippB_ucForwardingEntry_s;
```

In the data structure np_ipps_ucForwardingEntry_s implemented for configuring the ECMP table entries, the np_ip_network_addr_s variable sets the destination IP (e.g., subnet) address which, as shown in FIG. 2, is the subnet destination address field 52. The np_ipps_ecmpActionData_t variable provides data for setting of the threshold data (Action data fields) for each next hop choice (t=0,1, . . . , n) and, the np_ipps_nextHopForwardingInfo_s is the variable for setting the nextHop forwarding information, e.g., NextHop0, NextHop1, et. seq. If the user specifies that the cumulative threshold associated with each Next Hop (e.g., thr1, thr2, etc.) is less than 100, then there will be a corresponding Next Hop field in the ECMP table of FIG. 2. It should be understood to those skilled in the art that the pseudocode data structure described herein may be extended beyond three next hop options as described to as many next hops as desired or feasible. Additionally, skilled artisans will be able to allow for other weighting parameters such as packet type.

Referring to FIG. 4, a next step 210 is performed which is the step of setting the Next Hop forwarding information (IP Subnet, next hop(s), and action flags, etc.) in the ECMP packet forwarding entry. The following example C Language pseudocode sets forth an example data structure of type np_ipps_nextHopForwardingInfo_s that may be implemented for setting the next hop information in accordance with step 210, FIG. 4:

```
typedef struct
{
np__itf__handle__t outIntfHandle; /*intHandle outgoing interface*/
np__ipps__nextHop__t nextHop;    /*Next-hop Ip address*/
np__ipps__actionFlags__t actionFlags:  /*actionFlags is sum of action
values*/
}np___ipps__nextHopForwardingInfo__s;
```

In the data structure np__ipps__nextHopForwardingInfo__s implemented for forwarding the ECMP table entries, the np__ipps__nextHop__t variable sets the Next-hop IP address for each nextHop specified in the ECMP forwarding table of FIG. 2. The np__itf__handle__t is an outgoing logic value identifying the router interface.

Referring to FIG. 4, at next step 215, there is performed the step of testing for the Number of Next Hop Options, i.e., testing the ecmpActionData field in the packet forwarding table. As part of this test, at step 220, a determination is first made as to whether more than one Next Hop option is available, i.e., if ecmpThreshold1<100%. If ecmpThreshold1=100%, then there is provided only one next hop, and accordingly, at step 222, all packets will be routed according to the NextHop0 route option. Otherwise, at step 220, FIG. 4, if it is determined that there is more than one next hop option, then at step 225, for each packet to be forwarded, a hash value is computed from a packet "key" number built by picocode instructions executing in the network processor device. For example, a MAC address, or the IP source address and IP destination address values provided from the packet header, for example, may be concatenated or otherwise used to build a key which may be processed by a hash key to form a hashed key bit-pattern. The above-described network processor implements several fixed hash algorithms and which algorithm is available is specified in a lookup table. A programmable hash function may be used to add flexibility. Preferably, the output of the hash function is a m-bit number (m=16 or 32 bits).

After computing the hash value, a determination is made at step 227 as to whether the computed hash value is less than ecmpThreshold1, (e.g., 60 percent in the example ECMP table of FIG. 2). If the computed hash value is strictly less than ecmpThreshold1, then accordingly, at step 230, the NextHop0 route option is chosen. Otherwise, the process proceeds to step 235 and 236 where a determination is made as to whether the computed hash value is less than ecmpThreshold2 (e.g., between 60 percent and 90 percent in the example ECMP table of FIG. 2). If, at step 236, it is determined that the computed hash value is strictly less than ecmpThreshold2, then accordingly, at step 240, the NextHop1 route option is chosen. Otherwise, at step 236, if the computed hash value is equal to or greater than the ecmpThreshold2, then the NextHop2 route option is chosen at step 245. Upon selection of the next hop based on corresponding threshold values, next hop processing is done according to the chosen next hop (e.g., NextHop0–NextHop2).

While the invention has been particularly shown and described with respect to illustrative and preformed embodiments thereof, it will be understood by those skilled in the art that the if foregoing and other changes in form and details may be made therein without departing from the spirit and scope of the invention which should be limited only by the scope of the appended claims.

Having thus described our invention, what we claim as new, and desire to secure by Letters Patent is:

1. A system for forwarding packets in a network processor (NP) device comprising:

a configurable table implemented in said NP device for mapping a destination address associated with a packet to be forwarded to multiple, weighted next hop options in a networking environment, each said weighted next hop option comprising a threshold value corresponding to a computed probability of routing said packet through said next hop; and, mechanism for computing a hash value based on information associated with said packet to be forwarded;

mechanism for comparing said computed hash value of a packet to be forwarded with each said corresponding threshold value; and, device for routing said arrived packet via one of said multiple next hop options selected in accordance with a result of said comparing.

2. The system for forwarding packets in accordance with claim 1, wherein said mechanism for computing said weighting parameter includes a hash function for receiving said information associated with said packet to be forwarded and outputting said hash value associated therewith.

3. The system for forwarding packets in accordance with claim 2, wherein networking environment includes an IP network, said information associated with said packet including an IP source address and IP destination address of said packet to be forwarded.

4. A method for forwarding packets in a network processor (NP) device comprising:

a) providing entries in a packet forwarding table for mapping a destination address associated with a packet to be forwarded to multiple, weighted next hop options in a networking environment, each said weighted next hop option comprising a threshold value corresponding to a computed probability of routing said packet through said next hop; and, b) computing a hash value based on data associated with said packet to be forwarded;

c) comparing said computed hash value of a packet to be forwarded with each said corresponding threshold value; and, d) routing said packet via one of said multiple next hop options selected in accordance with a result of said comparing.

5. The method according to claim 4, wherein said step of providing entries includes a step of implementing an application programming interface for enabling a user to set said multiple, weighted next hop options for each said entries.

6. The method according to claim 4, wherein computing step b) includes applying a hash function to data associated with said packet to be forwarded; and, outputting said hash value associated therewith.

7. The method according to claim 6, wherein networking environment includes an IP network, said data associated with said packet including an IP source address and IP destination address of said packet to be forwarded.

8. A program storage device readable by a machine, tangibly embodying a program of instructions executable by the machine to perform method steps for forwarding packets in a network processor (NP) device, said method steps comprising:

a) providing entries in a packet forwarding table for mapping a destination address associated with a packet to be forwarded to multiple, weighted next hop options in a networking environment, each said weighted next hop option comprising a threshold value corresponding to a computed probability of routing said packet through said next hop; and, b) computing a hash value based on data associated with said packet to be forwarded;

c) comparing said computed hash value of a packet to be forwarded with each said corresponding threshold value; and, d) routing said packet via one of said multiple next hop options selected in accordance with a result of said comparing.

9. The program storage device readable by a machine as claimed in claim 8, wherein computing step b) includes applying a hash function to data associated with said packet to be forwarded; and, outputting said hash value associated therewith.

* * * * *